Patented Feb. 20, 1934

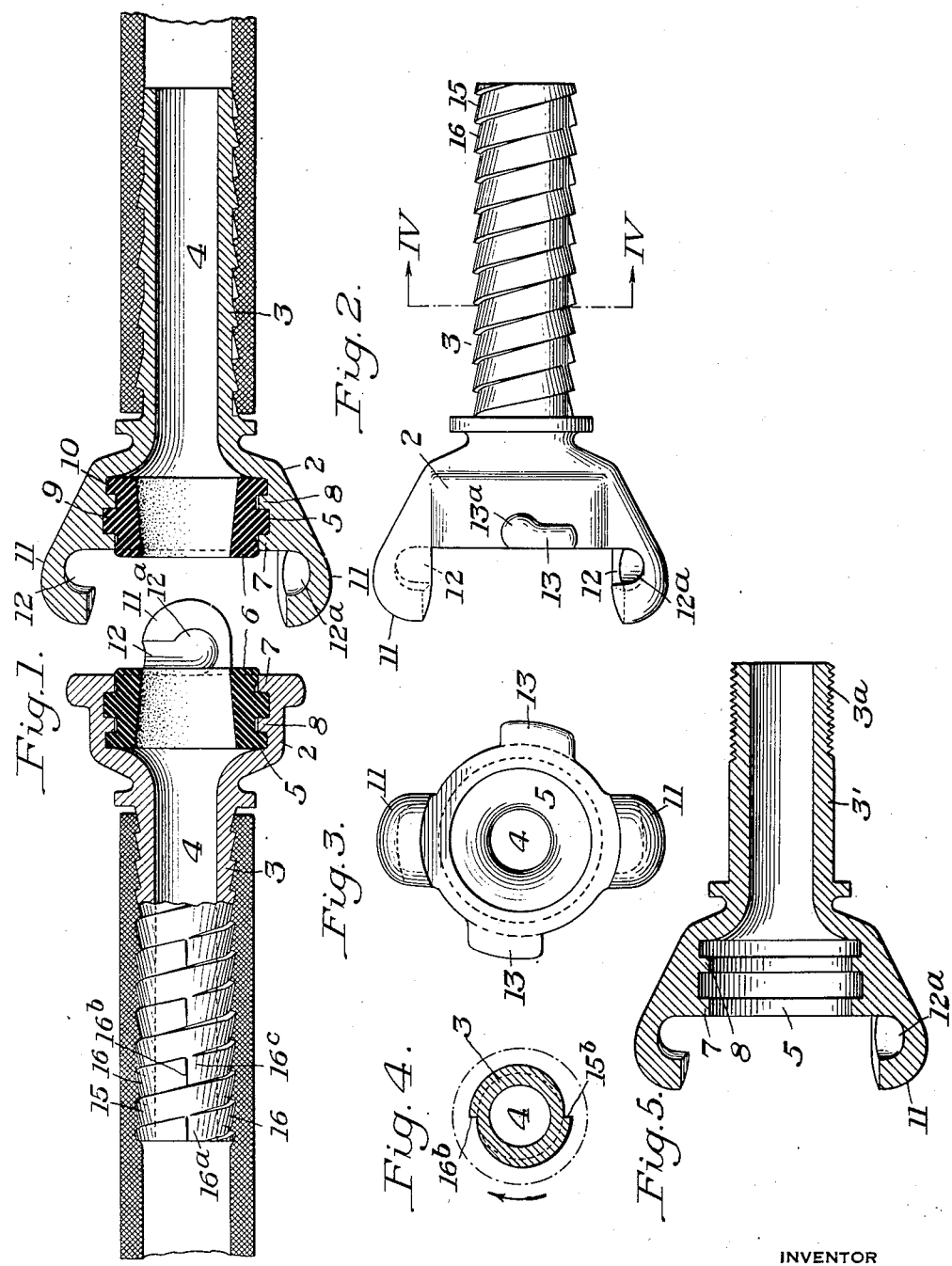

1,947,593

UNITED STATES PATENT OFFICE 1,947,593

HOSE COUPLING

Peter J. Hamilton, Cleveland Heights, Ohio

Application April 14, 1931. Serial No. 530,009

4 Claims. (Cl. 285—80)

The present invention relates to couplings for conduits, particularly flexible conduits such as hose and flexible pipe.

Various types of hose couplings have been developed in which two hose sections are connected together, or through which a hose is connected to a pipe wherein the coupling may be quickly made by fitting two coupling members together and twisting them through an arc, this type of coupling eliminating the threaded connection most commonly employed. The present invention pertains to this type of quick coupling and provides various improvements in such a coupling.

The invention may be readily understood by reference to the accompanying drawing in which Figure 1 represents a longitudinal section through the complementary parts of a coupling embodying my invention, one of the coupling members being shown partly in section and partly in elevation, while the other is shown completely in section;

Figure 2 is an elevation of one of the coupling members;

Figure 3 is an end view of the member shown in Figure 2;

Figure 4 is a transverse section in the plane of line IV—IV of Figure 2; and

Figure 5 is a modification illustrating one of the coupling members as having a standard pipe thread by means of which it may be connected to a standard pipe.

The complementary parts of the coupling are identical in construction, but in Figure 1 the section taken through the left-hand coupling member is in a plane at right angles to the section taken through the right-hand coupling member.

Each coupling member comprises a head portion 2 having an extension or shank 3 of reduced diameter and within the shank 3 is a passageway 4. Within the head 2 is a socket or enlarged recess 5 for the reception of a gasket 6. I prefer that the recess 5 shall be provided with two annular ribs or flanges 7 and 8, the flange 7 being at the end of the coupling and the flange 8 being set inwardly from the flange 7. The washer or gasket 6, which is preferably made of a resilient material such as soft rubber, is provided with ribs 9 and 10 fitting into the annular channels formed by the ribs 7 and 8.

On the head 2 are two diametrically opposite lugs 11 having a rounded peripheral portion and which slope on a gradual incline back toward the stem or shank 3. In each of these lugs 11 is a groove 12 the inner end of which groove is slightly enlarged. The groove is closed at one end and is open at the other end.

There are also two laterally projecting lugs or ears 13 on the head 2, these lugs or ears being diametrically opposite each other and being spaced substantially 90° from the lugs 11. They are relatively wide and are rounded and adapted to be received in the grooves 12 of a cooperating or complementary coupling member.

The manner in which the two coupling members cooperate is best understood by reference to Figures 1 and 3. The two coupling members are brought together with the lugs 13 of one section positioned at one side of the lugs 11 of the other section. As the two coupling members are pressed together they are then rotated, the lugs 13 of each coupling member entering the grooves 12 in the lugs 11 of the other coupling member. The twisting movement is continued until the lugs 13 have reached the ends of the grooves 12, and at this time the coupling is completed. As shown in Figure 2, the lugs 13 have the forward ends thereof slightly enlarged as indicated at $13^a$ so as to be received in the enlarged portions $12^a$ of the grooves 12. In making the coupling the gaskets are compressed and the pressure of the gaskets together with the shape of the lugs 13 and the grooves 12 keep the coupling from coming apart itself. The coupling may be taken apart at any time, however, by pressing the two members together and rotating them in the reverse direction to that in which they are rotated to make the coupling.

The shanks or extensions 3 of the couplings are ordinarily designed to be forced into the end of a hose, and a roughened surface is provided of such a character as to prevent the hose from easily pulling off the coupling or prevent the hose from being forced off by pressure.

According to the present invention a unique surface is provided which facilitates the insertion of the extension 3 into the end of the hose, but which keeps the hose from pulling or twisting off. According to my invention, there is a ratchet-shaped spiral groove or thread having a double lead, these leads starting from diametrically opposite points, each lead gradually dying out after one full turn in such manner as to leave a sharp corner where it starts again.

In the drawing, 15 designates one series of these spiral teeth or threads and 16 designates the other. Looking at the left-hand coupling member in Figure 1, the first thread 16 starts at $16^a$ and ends at $16^b$, thus making one full turn. At $16^b$ it breaks sharply and begins again at $16^c$. The thread 15 begins on the opposite side of the coupling and terminates on the opposite side of the coupling. The threads 15 and 16 are ratchet-shaped in that they have a taper toward the outer end of the shank and have an abrupt substantially vertical face on the other side of the thread. Moreover, in order to provide the abrupt shoulder at $16^b$, the thread is of diminishing height from the shoulder $16^b$ to the beginning of the turn where it substantially dies out. In other words, instead of there being two continuous leads, there are two interrupted leads. At each interruption there is a shoulder where the lead fades out and starts in again.

The advantage of this arrangement is that the extension can be readily screwed into the end of a hose so long as it is turned in a direction which will tend to thread or screw the coupling into the end of the hose. When the rotation is reversed, however, the abrupt shoulders, such as the shoulders 16ᵇ, prevent the reverse rotation of the parts. This is most clearly understood by reference to Figure 4 in which the broken line designates the contour of a hose while the cross-section of the extension is shown in full lines. The shoulders 15ᵇ and 16ᵇ do not interfere with the coupling being turned in the direction of the arrow in Figure 4, but they do interfere with the coupling being turned in the opposite direction. The ratchet-like form of the threads themselves of course tends to prevent the hose from being pulled longitudinally off the stem of the coupling.

It will be obvious that where it is desired to connect a hose with a pipe one of the coupling members may be the same as the coupling member shown in Figures 1 and 2, whereas the other coupling member may be of the construction shown in Figure 5. In this figure the shank 3' is provided with a threaded portion 3ᵃ, the thread being a standard pipe thread so that a standard coupling can be screwed onto it.

The construction of the interrupted lead screws on the shank of the coupling for retaining the hose constitutes an advantageous feature of the invention. The shape of the lugs 11 with the rounded outer ends and the long tapered surface is of considerable advantage in that when the hose is dragged over the floor or around door frames these inclined surfaces prevent the coupling from catching or hooking onto various objects or onto door frames or the like.

The construction of the coupling is such that it has considerable strength and can stand high pressures. The gasket is firmly anchored in the coupling so that it will not blow out under pressure, or become unseated when the coupling is dragged. The provision of two ribs on the gasket cooperating with the two spaced apart grooves in the coupling itself provides these advantages.

While I have described a preferred embodiment of my invention, various modifications and changes may be made therein within the contemplation of my invention and under the scope of the following claims.

I claim:

1. A hose connection having a tubular extension over which the hose is fitted, and two series of ratchet-like ribs on said extension, the ribs of one series being 180° out of phase with the ribs of the other series, said ribs being of gradually increasing height and terminating in an abrupt shoulder.

2. A hose connection having a tubular extension over which the hose is fitted, said extension having a ratchet-shaped spiral thread thereon having a double lead, these leads starting from diametrically opposite points, each lead gradually dying out after one full turn in such manner as to leave a sharp corner where it starts again.

3. A hose connection having a tubular extension over which the hose is fitted, said extension being provided with a spiral thread which slopes outwardly toward the free end of the extension and has an abrupt shoulder on its inner surface, the thread being interrupted at intervals by an abrupt shoulder, the height of the thread gradually diminishing away from said shoulder, said extension being provided with a second similar thread which starts 180° from the first.

4. A hose connection having a tubular extension over which a hose is fitted, said extension being provided with a plurality of ratchet-like threads, each thread extending through a full turn, terminating in an abrupt shoulder, starting again after each shoulder and gradually increasing in height through another complete turn, the starting points of the several threads being angularly separated, said threads having abrupt inner faces and tapered outer faces.

PETER J. HAMILTON.